Patented Aug. 9, 1938

2,126,151

UNITED STATES PATENT OFFICE 2,126,151

PROCESS OF FLOCCULATION

Alverd C. Stutson, Webster Groves, Mo., assignor to Monsanto Chemical Company, St. Louis, Mo., a corporation of Delaware No Drawing. Application August 31, 1936, Serial No. 98,737

5 Claims. (Cl. 210—23)

This invention relates to the purification of water. More particularly, the invention is directed to the art of clarifying water chemically through the use of flocculating or coagulating agents to remove insoluble and turbid substances.

It is an object of the present invention to provide a process for clarifying water, and for removing substances of the type which render the water turbid in appearance. The invention comprehends the purification of water intended to be used in industrial processes and for human consumption, and contemplates also a method for effecting the removal of obnoxious insoluble substances from waste liquids discharged from textile and dye works, paper mills and the like, and from liquids unfit for discharge into surface streams.

A further object of the invention is to provide a chemical process for clarifying or purifying water chemically which is efficient and economical and which is superior to the methods which heretofore have been known and used.

A still further object of the present invention is to provide a process for treating water to remove oil emulsified therewith as the disperse phase. In this respect the present invention comprehends the processing of oil-contaminated condensate from prime movers, pumps, and from processes in which oil is contained in water in the form of a tight emulsion.

By reason of the fact that the nature of impurities contained in given supplies of water are so variable, the problem of purification is difficult and complex. Contamination, for example, may be composed largely of the relatively heavy substances such as sand and clay. These will settle relatively rapidly if the water is allowed to remain quiescent for any appreciable period of time. On the other hand, the impurities may be solid or quasi-solid bodies which exhibit the tendency to settle extremely slowly. They may be partially compatible with the water, or they may possess specific gravity approximating that of the water, so that they tend to remain suspended. In still other instances, water may be rendered turbid in appearance by organic or inorganic water, colloidally dispersed in, or emulsified with the water.

This invention relates particularly to a new art or process by means of which water containing insoluble impurities of the various classes described is clarified, and whereby the water is purified in a short period of time so as to be totally or substantially free of insoluble contaminants. The present invention is described and claimed as an improvement over the chemical coagulating or flocculating processes which heretofore have been known.

Chemicals have been used in an effort to force the separation. These chemicals usually have been of the type adapted to coagulate or collect the turbid contamination within a flocculent mass having a specific gravity sufficiently different from that of the water to separate therefrom relatively rapidly.

Generally, chemicals such as alum, ferrous sulphate, sodium aluminate and ferric chloride have been used as the coagulating agents. Alkali, such as sodium hydroxide is added to the water to react therewith and form a flocculent precipitate of the desired characteristics.

Since the coagulating agents and the alkali reagents which have been used, have been in the solid form it has usually been necessary to prepare aqueous solutions of these bodies in order to obtain the reaction desired. In the past it has been the conventional practice, either to dissolve the coagulating reagents directly in the water being treated, or to prepare aqueous solutions of these bodies, then add these solutions to the water to provide the results intended. In either of these instances, it has been the practice to agitate the water vigorously during the period of time that the chemicals were being added and, to accomplish such agitation, a wide variety of apparatuses has been used or proposed to be used. In some cases, water has been treated in tanks equipped with paddles mechanically operated. Basins, baffled so as to cause the water to take a circuitous, turbulent path also have been used. Likewise dumping pits in which the chemicals are introduced under highly turbulent conditions, and straight flow conduits adapted to produce turbulences in the water at local areas have been suggested.

According to these prior processes, the methods of chemical coagulation which have been known in the past are characterized in two respects. In the first place, the water to be treated is agitated vigorously during the additive or reaction stage of the process for a period of time supposedly long enough to facilitate thorough intermixing, and thus to provide flocculent masses of the desired characteristics. Then the water gradually is allowed to become quiescent to facilitate settling. These general methods of mixing, then agitating, and then settling usually have been satisfactory so far as clarification of the water has been concerned. They have not, however, been efficient because too large quantities of coagulating agents have been necessary to accomplish the removal of relatively small amounts of contamination, too much time has been required for complete settling, and very large tanks have been required to satisfy the storage requisites.

According to the process of the present invention the time required for effecting clarification of a given body of water is greatly reduced, the amount of chemical reaction necessary to effect the clarification is much smaller than the amount required according to the conventional processes which heretofore have been known, and the water is purified consistently to the greatest possible degree commensurate with commercial conditions of operation.

By the method of the present invention, optimum clarification is provided by a coagulum formed under conditions of turbulence which are adjusted and controlled in accordance with the growth of crystals of coagulum. If the degree of turbulence of water is adjusted in accordance with the size of the crystals of the collective mass being formed in the water and this control is continued until the crystals reach the size providing optimum flocculation, then the time required for the subsequent settling is reduced to a minimum, and all or substantially all of the substances which render the water turbid are collected in the movement of the mass through the water during the settling phase of the process.

A second feature of the present invention, however, resides in the determination that the preferred process provides greatly improved results when a new material, ferric sulphate, is used as the coagulating agent. Thus, the invention comprehends first a process adapted to use with conventional coagulants such as alum, ferrous sulphate, sodium aluminate, ferric chloride and the like, and more particularly, a process in which additional improvements in results are provided when ferric sulphate is used as the primary coagulant.

Ferric sulphate is a chemical which has the general formula $Fe_2(SO_4)_3$. It is available commercially in the anhydrous grade, which contains generally about 92% of soluble chemical. It reacts with sodium hydroxide over an appreciable pH range to provide a gelatinous flocculent highly collective mass, $Fe(OH)_3$. The precise chemical reasons for its superior qualities as a flocculating agent are not exactly understood, but from the practical point of view, it may be stated the pH value of the water with which the ferric sulphate is used may vary over an appreciable range without greatly disturbing the quality of the results and it is thus possible to obtain a greater range of pH in the water treated. Furthermore, the floc formed from ferric sulphate is relatively free flowing, soft and loose. This quality prevents packing of the floc and insures continuity of the purification process.

The characteristics of my preferred process of flocculation are such that they peculiarly enhance the capacities of ferric sulphate as a flocculating agent. The free flowing characteristics of the flocculent mass formed from the characteristic complement the advantages which are to be obtained by the control of turbulence during floc formation and during settling.

Generally speaking, most types of turbid water can be treated with ferric sulphate according to my preferred method of flocculation in a single coagulation. The nature and amount of suspended matter in the water, the pH value of the water, the amount of flocculating agent added, the time of settling and as previously discussed, the rate and time of stirring in relation to the state of growth of the crystals of coagulum each constitutes a factor which influences the quality of the results of coagulation of a particular type of water.

Aside from the removal of natural impurities from water, the problem of removing oil is one of considerable industrial importance especially in instances where water is to be used for steam generation. In small capacity steam plants the conventional water cycle comprises the generation of steam from the water in a boiler, the generation of power from the steam in a reciprocating engine, the condensation of the exhaust steam from the engine, and the reutilization of the steam condensate in the boiler. Exhaust steam from pumps, machines and processes may also be condensed. The oil used for lubrication purposes in the reciprocating engine and in the reciprocating pumps is swept by the steam during the exhaust period and thus is entrained. Condensation of the exhaust steam provides water practically pure in all respects except for the oil contained. But this quota generally is sufficient to prevent reutilization of the steam condensate in the boiler for the reason that the oil causes foaming or frothing, induces carry over of water particles with the steam and complicates problems of maintenance in the boiler itself and possibly in the engines.

The oil contaminating the steam condensate may be in the emulsified state or it may appear as free oil. In either instance, however, its specific gravity generally is sufficiently close to that of the water to make its removal extremely difficult. Large particles of free oil, being lighter than water float to the water surface and this quota sometimes can be removed by a surface skim. The remainder of the oil present frequently cannot be removed even by passage of the water through textile, paper or sponge filters. Alum used as a flocculating agent to effect the removal of oil so entrained provides a coagulum too light and feathery to collect the oil particles properly. Agents of this type moreover are not satisfactory because of the extremely close pH control necessary to enable the flocculating agent to function efficiently. There is a further disadvantage in the use of agents of this type in that the pH value most conducive to proper floc function is about 6.8 which value is sufficiently acid to cause corrosion in iron piping.

I have determined that free and emulsified oil in water not removable conveniently and consistently by conventional methods is removable therefrom in an easy and positive manner through the use of my preferred method of coagulation with ferric sulphate as the coagulant. Generally, about 5 parts per million of ferric sulphate and about 10–13 parts per million of soda ash, more or less, are all of the chemical necessary to accomplish such purification. I have determined that most satisfactory results usually are obtained when the pH value is maintained approximately in the range of about 7.8 to 8.2, although results, even with water containing as much as 30 parts per million of oil, are satisfactory through a pH range of 5.5 to 8.6. Aluminum sulphate and like materials are only partially effective through a pH range of about 6.7–6.8.

It should be understood that these pH values may be increased or decreased over a considerable range, according to the particular nature, quantity and type of oil or contamination present in the water, and also according to the pH value of the water, and its turbidity aside from that produced by oil. The complete or substantial removal of oil can be effected from water containing contamination other than the oil itself as well as from water substantially pure in other respects.

When steam condensate, for example, is being freed of oil, according to the invention, the oil in some instances may cause the floc which has been formed to rise to the surface of the water instead of settling, in which instance the mass in which the oil is collected after the water has been allowed to stand in quiescent state is removed either by skimming the surface of the water or by conventional filtration. In other instances where contamination other than oil is present, the flocculation mass in which the contamination is collected possesses sufficient specific gravity to settle rapidly to the bottom of the containing vessel and the water, after settling, may be syphoned from the vessel or may be passed through a conventional filter apparatus.

Having described my invention, I claim:

1. The method of removing oil compatibly associated with steam condensate, which method comprises subjecting the water containing said oil to the action of a coagulum formed through the reaction of ferric sulphate and an alkali.

2. The method of freeing steam condensate of oil compatibly associated therewith, which method comprises subjecting the particles of said oil to the collective action of a coagulum formed through the reaction of ferric sulphate and an alkali which coagulum is comprised of crystals the size of which at any time during their state of formation is adjusted to the intensity of turbulence to which said crystals are subjected in said water.

3. The method of effecting the removal of oil from aqueous steam condensate in which the same creates a turbid appearance, which method comprises subjecting said condensate to the action of a coagulum formed from the reaction of ferric sulphate and an alkali while the pH value of the condensate is maintained at approximately 8.0.

4. A method of treating oil contaminated steam condensate to remove the oil therefrom, which method comprises establishing a coagulum in the condensate by adding an alkali and ferric sulphate thereto, permitting the coagulum to settle and collect the oil and then separating the condensate from the coagulum containing the oil.

5. A method for purifying oil contaminated steam condensate, which method comprises forming in the condensate a coagulum resulting from the reaction of ferric sulphate with an alkali, settling the coagulum thus formed over a period of time sufficient to enable the coagulum to collect the oil, and then separating the coagulum containing the oil from the condensate.

ALVERD C. STUTSON.

CERTIFICATE OF CORRECTION.

Patent No. 2,126,151. August 9, 1938.

ALVERD C. STUTSON.

It is hereby certified that error appears in the printed specification of the above numbered patent requiring correction as follows: Page 1, first column, line 46, for the word "water" read matter; and that the said Letters Patent should be read with this correction therein that the same may conform to the record of the case in the Patent Office.

Signed and sealed this 11th day of October, A. D. 1938.

Henry Van Arsdale (Seal) Acting Commissioner of Patents.

range, according to the particular nature, quantity and type of oil or contamination present in the water, and also according to the pH value of the water, and its turbidity aside from that produced by oil. The complete or substantial removal of oil can be effected from water containing contamination other than the oil itself as well as from water substantially pure in other respects.

When steam condensate, for example, is being freed of oil, according to the invention, the oil in some instances may cause the floc which has been formed to rise to the surface of the water instead of settling, in which instance the mass in which the oil is collected after the water has been allowed to stand in quiescent state is removed either by skimming the surface of the water or by conventional filtration. In other instances where contamination other than oil is present, the flocculation mass in which the contamination is collected possesses sufficient specific gravity to settle rapidly to the bottom of the containing vessel and the water, after settling, may be syphoned from the vessel or may be passed through a conventional filter apparatus.

Having described my invention, I claim:

1. The method of removing oil compatibly associated with steam condensate, which method comprises subjecting the water containing said oil to the action of a coagulum formed through the reaction of ferric sulphate and an alkali.

2. The method of freeing steam condensate of oil compatibly associated therewith, which method comprises subjecting the particles of said oil to the collective action of a coagulum formed through the reaction of ferric sulphate and an alkali which coagulum is comprised of crystals the size of which at any time during their state of formation is adjusted to the intensity of turbulence to which said crystals are subjected in said water.

3. The method of effecting the removal of oil from aqueous steam condensate in which the same creates a turbid appearance, which method comprises subjecting said condensate to the action of a coagulum formed from the reaction of ferric sulphate and an alkali while the pH value of the condensate is maintained at approximately 8.0.

4. A method of treating oil contaminated steam condensate to remove the oil therefrom, which method comprises establishing a coagulum in the condensate by adding an alkali and ferric sulphate thereto, permitting the coagulum to settle and collect the oil and then separating the condensate from the coagulum containing the oil.

5. A method for purifying oil contaminated steam condensate, which method comprises forming in the condensate a coagulum resulting from the reaction of ferric sulphate with an alkali, settling the coagulum thus formed over a period of time sufficient to enable the coagulum to collect the oil, and then separating the coagulum containing the oil from the condensate.

ALVERD C. STUTSON.

CERTIFICATE OF CORRECTION.

Patent No. 2,126,151.   August 9, 1938.

ALVERD C. STUTSON.

It is hereby certified that error appears in the printed specification of the above numbered patent requiring correction as follows: Page 1, first column, line 46, for the word "water" read matter; and that the said Letters Patent should be read with this correction therein that the same may conform to the record of the case in the Patent Office.

Signed and sealed this 11th day of October, A. D. 1938.

Henry Van Arsdale (Seal)   Acting Commissioner of Patents.